United States Patent [19]
Fox

[11] 4,217,835
[45] Aug. 19, 1980

[54] DEPTH CONTROL AND SEED BOOT ASSEMBLY FOR TILLAGE APPARATUS

[75] Inventor: Robert E. Fox, Minburn, Iowa

[73] Assignee: Deere & Company, Moline, Ill.

[21] Appl. No.: 955,499

[22] Filed: Oct. 27, 1978

[51] Int. Cl.$^2$ .......................... A01C 5/06; A01C 7/20
[52] U.S. Cl. ........................................ 111/85; 111/81; 111/87; 172/80; 172/188; 172/394
[58] Field of Search ................. 111/81, 84, 85, 86, 111/87, 71; 172/80, 387, 393, 394, 188

[56] References Cited

U.S. PATENT DOCUMENTS

| | | | |
|---|---|---|---|
| 799,676 | 9/1905 | Roby et al. | 111/87 |
| 1,747,525 | 2/1930 | Nagy | 111/85 |
| 2,576,756 | 11/1951 | Greaves | 172/387 |
| 4,051,792 | 10/1977 | Brandt, Jr. et al. | 111/85 |

FOREIGN PATENT DOCUMENTS

| | | | |
|---|---|---|---|
| 419214 | 12/1910 | France | 111/84 |
| 79329 | 10/1962 | France | 111/85 |
| 425564 | 10/1974 | U.S.S.R. | 172/80 |

*Primary Examiner*—Edgar S. Burr
*Assistant Examiner*—Steven A. Bratlie

[57] ABSTRACT

A depth control skid and seed boot assembly is disclosed that is particularly useful in a sod seeding implement for adjusting the maximum depth of cut of a cutting wheel and for adjusting the depth of the seed boot independently of each other. An arm rotatably mounting a pair of cutting wheels slidably receives the forward section of the skid. The rear of the skid is bolted to a bracket assembly vertically positionable with respect to the arm for adjusting the depth of cut. The bracket assembly pivotally carries the seed boot which is yieldingly and adjustably held in position with respect to the ground by a bolt and spring assembly. The seed boot can pivot upwardly against the bias of the spring out of the way of obstacles.

14 Claims, 4 Drawing Figures

DEPTH CONTROL AND SEED BOOT ASSEMBLY FOR TILLAGE APPARATUS

FIELD OF THE INVENTION

This invention relates generally to a seeding implement and specifically to a depth control and seed boot assembly for a sod seeding implement.

BACKGROUND OF THE INVENTION

In order to provide a tillage and seeding apparatus particularly suited for preparing ground for seeding or grassland renovation where sod is present, towed implements having a series of cutting wheels driven to open a furrow have been developed. Devices of this type are shown, for example, in U.S. Pat. Nos. 4,023,510, 4,043,281, 4,043,404 and 4,051,792. This type of tillage implement is particularly useful where legumes are to be grown in established grass sod, especially since the ground surface is often uneven or rocky and may have grass swards of differing thickness thereon.

Various methods have been used to adjust the depth of cut of the cutter wheel and position of the seed boot with respect to the ground. For example, cylindrically shaped skids have been mounted on the support arms rearwardly of the cutter wheels. Tabs extending rearwardly from the arms carry the seed boots. In another embodiment a skid is pivotally connected near its forward end to the arm and a threaded depth control rod connected between the arm and the rear of the assembly is adjustable to vary the cutting depth. The seed boot is mounted directly on the skid. Such units are described in the aforementioned U.S. Pat. Nos. 4,023,510 and 4,051,792, respectively.

Because of the ground conditions encountered, the skids are subject to a considerable amount of wear and frequently must be replaced. It is not uncommon for the seed boots to break when obstacles such as rocks are hit since the boots are rigidly connected to the arm or skid. The previous means for attachment provided for little or no adjustment of the seed boot in relationship to the ground.

SUMMARY OF THE INVENTION

This invention provides an improved depth control and seed boot assembly for a tillage implement that is adjustable for varying the depth of the furrow cut and for varying the position of the seed boot and that allows the seed boot to pivot away from obstacles such as rocks.

It is, therefore, an object of the present invention to provide an improved depth control and seed boot assembly for a tillage implement.

It is a further object of this invention to provide a depth control and seed boot assembly having means for adjusting the depth of the furrow cut and for adjusting the depth of the seed boot independently of each other.

It is still another object to provide a depth control and seed boot assembly in which the seed boot pivots upwardly out of the way of obstacles.

It is a further object to provide a depth control skid which may be quickly and easily removed from the arm and replaced.

These and other objects and advantages of the present invention will become apparent from the description which follows and from the drawings.

DESCRIPTION OF THE PREFERRED EMBODIMENT

Figure 1:
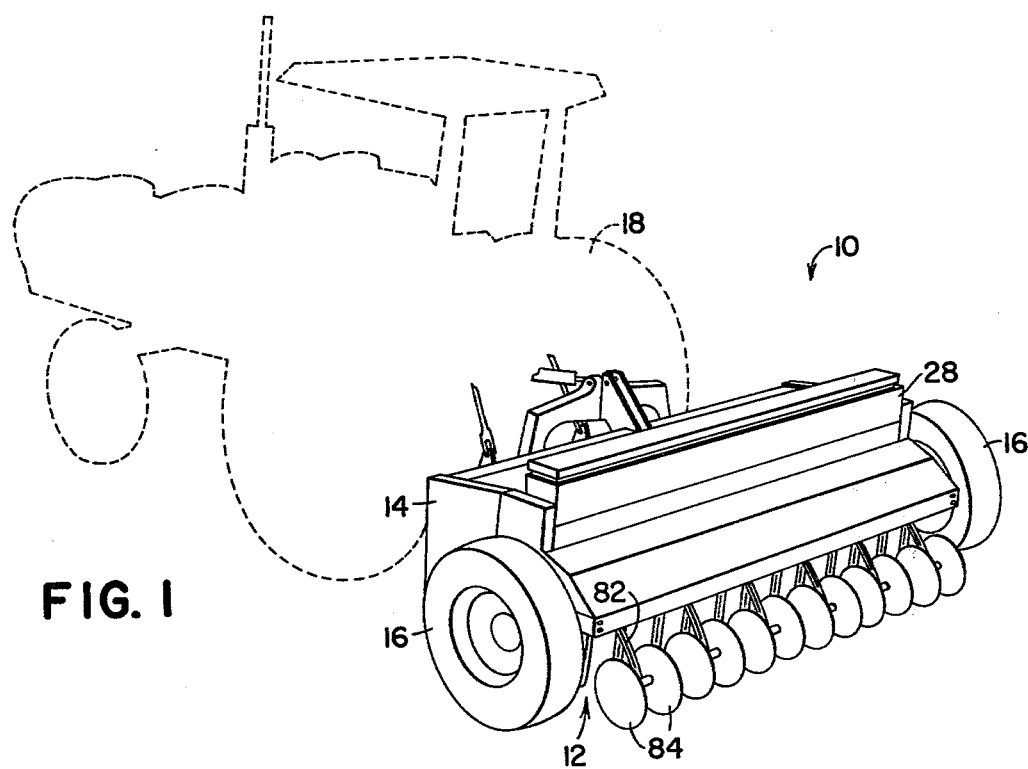
FIG. 1 is a perspective view of a tillage apparatus with the improved assembly of this invention mounted thereon.

Referring to FIG. 1, a tillage implement 10 is shown that includes the improved depth control and seed boot assembly 12 of the present invention. The implement 10 includes a main frame member 14 supported on ground wheels 16 and adapted for towing by a tractor 18. The implement is powered through a conventional drive assembly from the power take-off of the tractor.

The main frame 14 supports a plurality of pivoted arms or frames 20, each carrying a pair of cutter wheels 22. A seed boot 24 is supported rearwardly of each cutter wheel 22 and is connected through a seed tube 26 and a conventional seed metering unit (not shown) to a seed hopper 28. A more detailed description of the implement can be found in the aforementioned patents.

Figure 2:
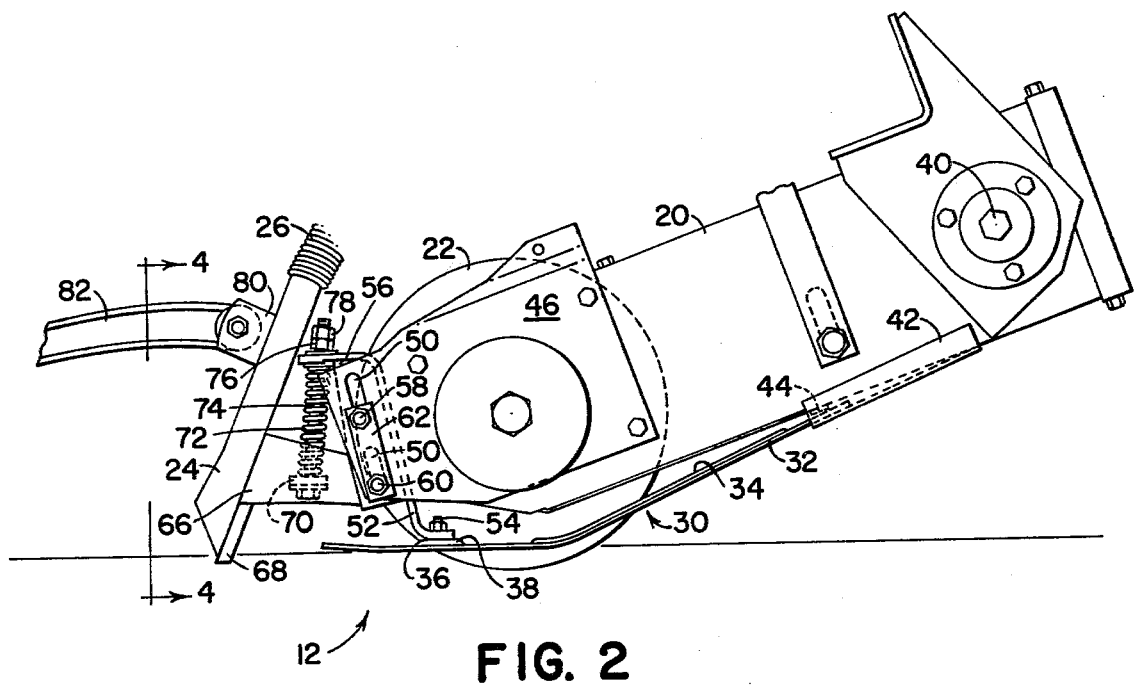
FIG. 2 is a side view of the depth control and seed boot assembly.
Figure 3:
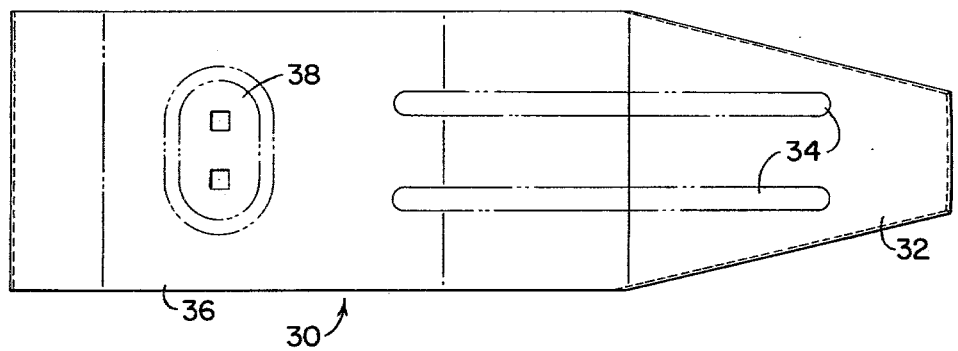
FIG. 3 is a top view of the depth control skid.
Figure 4:
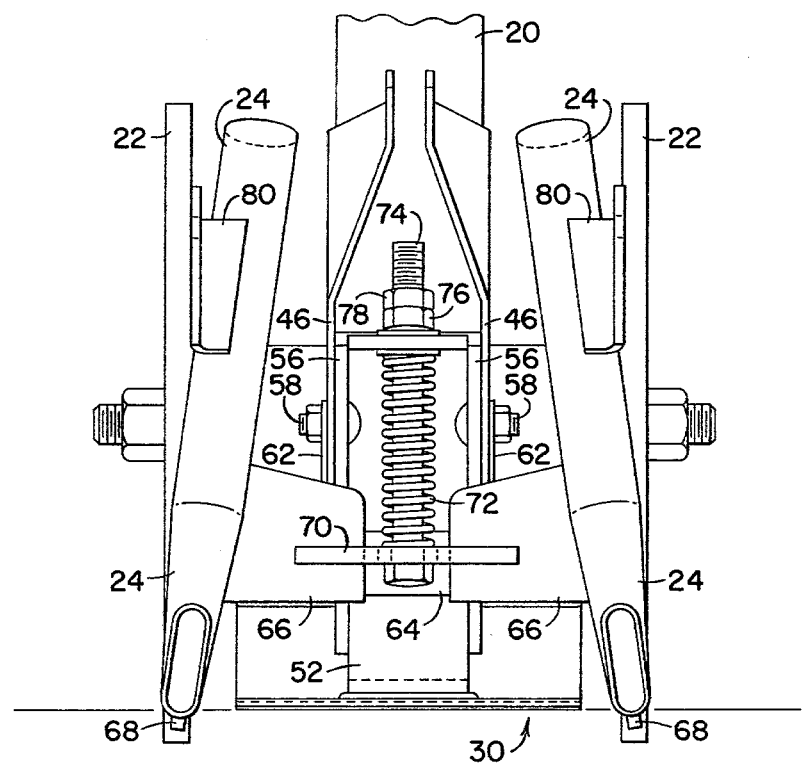
FIG. 4 is a rear view of the assembly shown in FIG. 2 taken along the lines 4—4, with the packer wheel arm removed for clarity.

The depth control and seed boot assembly 12, as best seen in FIG. 2, includes a depth skid 30 having a tapered forward section 32, reinforcing ribs 34, and a rear ground engaging section 36 including a bolt receiving projection 38. The section 36 is bent at an angle with respect to the remainder of the skid 30.

The arm 20 is connected to the frame for pivoting about the axis of a shaft 40 which drives the cutter wheels 22 through a chain drive assembly (not shown) within the arm. A U-shaped bracket 42 is secured to the arm 20 and forms a pocket for slidably receiving and supporting the forward section 32 of the depth skid 30. A spacer 44 limits the vertical movement of the skid at the rear of the bracket 42. Two skid support panels 46 are bolted on opposite sides of the arm 20 and each includes a rearward section extending behind the arm. Each of the panels 46 includes a pair of generally vertical slots 50.

A seed tube support strap or bracket 52 is secured to the projection 38 near the rear of the depth skid 30 by a pair of bolts 54. The bracket 52 extends upwardly between the panels 46 and then angles rearwardly toward the seed boot 24. Welded on each side of the bracket 52 is a side strap 56 with two holes aligned with the slots 50. The width of the bracket 52 with the side straps 56 is approximately equal to the distance between the rearward sections of the panels 46. Bolts 58 and 60 extend through holes in a channel strap 62 outside each of the panels 46, through the slots 50 and the holes in the side straps 56. The bolts 58 and 60 are tightened against the straps 62 to secure the bracket 52 with respect to the arm 20.

A bushing assembly is secured between the side straps 56 and includes a bearing member 64 mounted for pivoting about the axis of the bolt 60. A pair of opposed pivot support members 66 are welded to and diverge outwardly from the bearing member 64. A seed boot 24 is welded to each member 66 directly behind a cutter wheel 22. A runner 68 is secured to the forward side of the boot 24 below the member 66.

A cross member 70 is welded between and spaces the opposed members 66. A spring 72 is inserted between the end of the support bracket 52 and the cross member 70. A bolt 74 extends upwardly through a hole in the cross member 70, through the spring 72, and through a hole in the bracket 52. A nut 76 is threaded over the bolt 74 to secure it and the spring in position and to limit the extent the seed boot 24 pivots downwardly. A jam nut 78 is tightened against the nut 76.

Brackets 80 welded to the seed boots 24 pivotally carry a packer wheel arm 82. Mounted on the arm for following the furrows cut by the cutter wheels 22 and packing seeds therein are packer wheels 84. A more detailed description of the packer wheel assembly can be found in the aforementioned U.S. Pat. No. 4,043,281.

To increase or decrease the depth of cut of the cutter wheels 22, the nuts on bolts 58 and 60 are loosened and the bracket 52 is lowered or raised, respectively, to change the position of the ground-engaging section 36 with respect to the bottom of the arm 22. As is evident from FIG. 2, the relationship between the seed boot 24 and ground remains virtually unchanged as the depth of cut is adjusted.

To increase or decrease the maximum working depth of the seed boot 24, the jam nut 78 is loosened and the nut 76 is loosened or tightened, respectively, on the bolt 74. The spring 72 biases the seed boots 24 downwardly into the furrow, and the bolt 74 limits the amount the boots pivot according to the position of the nut 76. The depth of cut is virtually unaffected by the seed boot adjustment.

When the seed boot strikes a rock or other obstacle, the assembly including the boots 24 and the support members 66 pivots upwardly about the axis of the bolt 60, compressing the spring 72 between the cross support 70 and the bracket 52. As the boot clears the obstacle, the spring 72 returns the assembly to the working position determined by the adjustment of the nut 76.

The depth skid 30 can be separated from the rest of the assembly by simply removing the two bolts 54 and sliding the skid rearwardly out of the pocket formed by the bracket 42. When assembling the unit, the forward section 32 of the skid is inserted in the bracket 42 and the bolts are inserted through the holes in the projection 38 and the bracket 52.

I claim:

1. In a tillage unit having a cutter wheel for cutting a furrow, a vertical positioning assembly comprising:
   adjustable ground-engaging skid means mounted on the unit for controlling the depth of the furrow cut;
   seed tube means located rearwardly of the skid means for depositing seeds in the furrow;
   tube positioning means connected between the skid means and the tube means for adjusting the latter vertically with respect to the former, the positioning means including a yieldable member permitting movement of the tube means with respect to the skid means; and
   depth control means connected between the unit and the skid means for adjusting the skid means with respect to the unit independently of the adjustments of the tube means to control the depth of the furrow cut while maintaining the vertical position of the seed tube means with respect to the skid means.

2. The invention defined in claim 1 wherein the positioning assembly further comprises a skid support mounted on the unit for slidably receiving the forward end of the skid means.

3. The invention defined in claim 1 wherein the tube positioning means includes a bracket connected to the rear of the skid means and the yieldable member comprises a spring connected between the tube means and the bracket.

4. The invention defined in claim 3 wherein the depth control means comprises a bolt member attached to the bracket and a substantially vertically slotted member connected to the unit for slidably receiving the bolt member therein.

5. The invention defined in claim 3 wherein the seed tube means is pivotally connected to the bracket.

6. In a tillage apparatus including a frame, a cutter wheel rotatably mounted on the frame for cutting a trench in the soil, and a seed boot member mounted behind the cutter wheel for depositing seed in the trench, a support assembly for independently adjusting the depth of cutting and the vertical relationship between the trench and the seed boot member comprising:
   a skid member adjustably secured to the frame for variably positioning the frame above the surface of the soil;
   boot support means connected to the rear of the skid member for yieldingly and adjustably supporting the seed boot member in a preselected position with respect to the skid member regardless of the relative position of the skid member and the frame, the boot support means including biasing means for urging the seed boot assembly toward the preselected position but allowing it to move with respect to the skid member when encountering obstacles.

7. The invention defined in claim 6 wherein the skid member includes a forwardly supported section slidably received by the frame.

8. The invention defined in claims 6 or 7 wherein the boot support means further includes an upstanding bracket member secured near the rear of the skid member and pivot means rockably connecting the seed boot member to the bracket.

9. The invention defined in claim 8 wherein the biasing means comprises a spring member connected between the bracket member and pivot means.

10. The invention defined in claim 9 further including an adjustable limit member connected between the bracket and the seed boot assembly to limit the rocking of the latter in one direction for adjusting the preselected position.

11. For a tillage implement having a rotating cutting wheel for cutting a furrow in soil, a frame supporting the wheel, and a seed boot member mounted behind the wheel for depositing seeds in a furrow, adjustable support means comprising:
   skid means mounted on the frame and vertically positionable with respect thereto for adjusting the depth of the furrow cut by the wheel; and
   a boot support assembly connected to the rear of the skid means for supporting the seed boot member and positioning it vertically with respect to the skid means so that the depth of the furrow cut can be adjusted while maintaining the vertical relationship of the seed boot member member and the skid means, the boot support assembly including means for adjusting the vertical relationship of the seed boot and the skid means to position the boot member with respect to the furrow independently of the depth of furrow cut adjustment, and further including protection means for yieldingly biasing the seed boot member to its adjusted position.

12. For a tillage implement having a cutter wheel for cutting a furrow and a seed boot member for depositing seeds therein:
   a frame member connected to the implement for rotatably supporting the cutter wheel;
   a skid member including a forward section and rearward section;
   front support means connected to the frame member for slidingly receiving the forward section;
   rear support means connected between the frame and the rearward section for supporting the frame above the skid member and including furrow depth adjustment means for selectively varying the distance between the frame and skid member;
   boot support means connected to the rearward section for yieldingly supporting the seed boot member in a predetermined position relative to the skid member, said support means including boot adjustment means for selectively varying the predetermined position to adjust the seed boot member vertically with respect to the furrow independently of furrow depth adjustments.

13. The invention defined in claim 12 wherein the boot support means includes a spring member connected between the rear support means and the seed boot member for biasing the boot member downwardly toward the adjusted position, and the boot adjustment means includes a variable length rod member connected between the rear support means and boot member for preventing the latter from moving downwardly beyond the adjusted position but allowing it to move upwardly against the bias of the spring member.

14. In a tillage implement having a frame and a fore-and-aft extending supporting structure carried at its forward end for vertical swinging movement and extending therefrom to a rear end carrying a pair of transversely spaced cutter wheels for cutting a pair of trenches in the soil surface, the improvement residing in:
   a gauge plate having a lower horizontal ground-engaging portion disposed alongside the respective cutter wheels with a lower surface and a forward inclined portion underlying the supporting structure and terminating at a forward end;
   upright bracket structure vertically adjustably supported on the rear end of the supporting structure and having upper and lower ends, the latter of which is connected to the horizontal ground-engaging portion;
   a fore-and-aft tube supporting arm pivotally mounted at its forward end to the bracket structure to swing vertically and extending rearwardly therefrom;
   a pair of vertical seed tubes supported on the arm having lower discharge ends behind and in trailing relation to the respective cutter wheels, spring means extending between the arm and bracket structure for yieldably resisting vertical shifting of the tubes; and
   structure on the underside of the supporting structure providing a rearwardly opening aperture for receiving the forward end of the forward inclined portion of the gauge plate.

* * * * *

UNITED STATES PATENT OFFICE
CERTIFICATE OF CORRECTION

Patent No. 4,217,835　　　　　　　　Dated 19 August 1980

Inventor(s) Robert E. Fox

It is certified that error appears in the above-identified patent and that said Letters Patent are hereby corrected as shown below:

Column 4, line 63, after "member" delete "member"; line 66, after "boot", first occurrence, insert -- member --.

Signed and Sealed this

Tenth Day of February 1981

[SEAL]

Attest:

RENE D. TEGTMEYER

Attesting Officer　　　Acting Commissioner of Patents and Trademarks